No. 767,538.

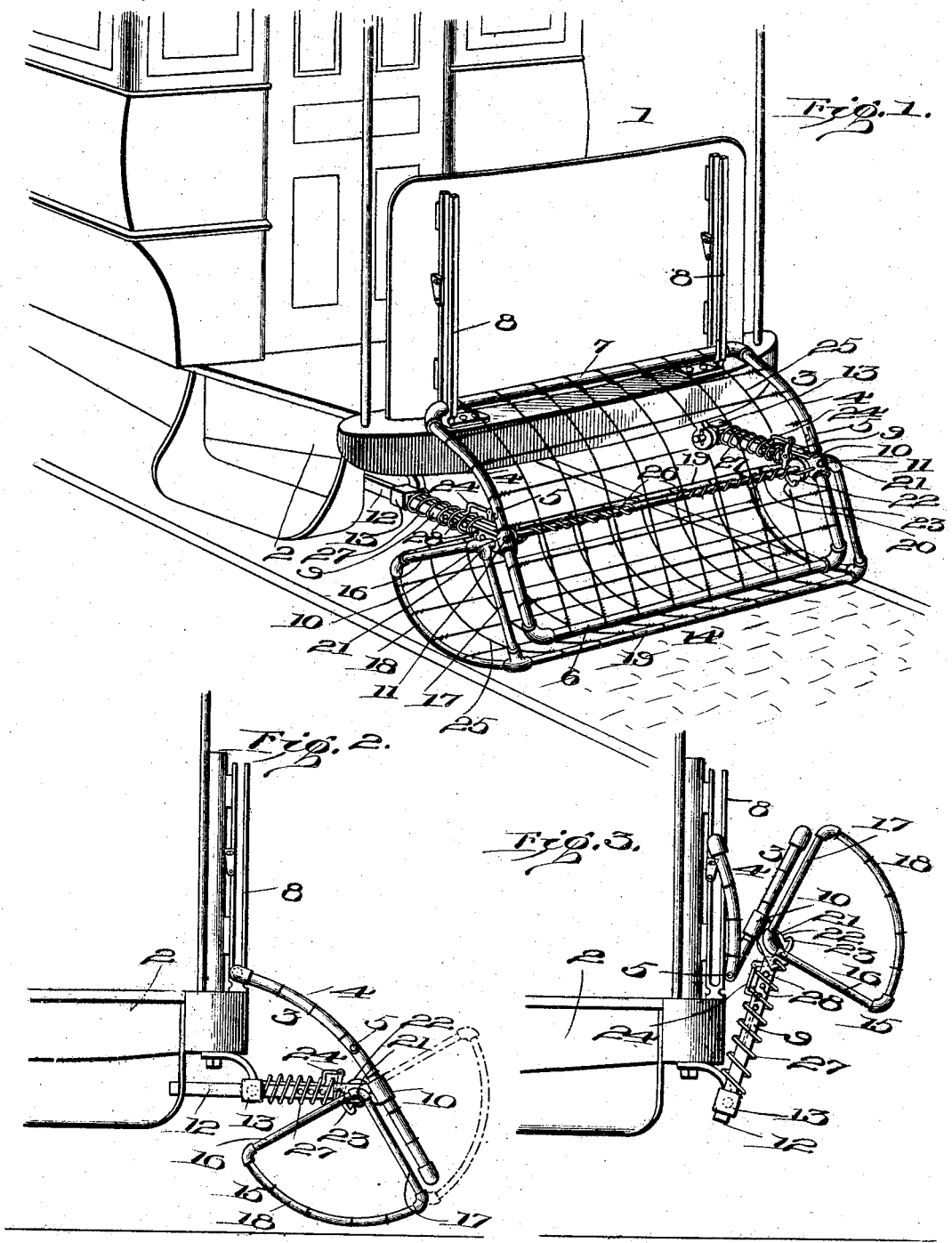

Patented August 16, 1904.

UNITED STATES PATENT OFFICE.

WILLIAM E. ZACHRY, OF BROOKLYN, NEW YORK.

CAR-FENDER.

SPECIFICATION forming part of Letters Patent No. 767,538, dated August 16, 1904.

Application filed December 15, 1903. Serial No. 185,258. (No model.)

*To all whom it may concern:*

Be it known that I, WILLIAM E. ZACHRY, a citizen of the United States, and a resident of Brooklyn, in the county of Kings and State of New York, have invented certain new and useful Improvements in Car-Fenders, of which the following is a specification.

My invention relates to car-fenders. It has for its object to provide a fender comprising a folding frame adapted to be removably supported on one end of a car and having a second frame pivoted to "turn" with relation thereto, whereby when the fender comes into contact with an object in front of the car the pivoted frame will be thereby released and spring up and support such object free of the ground and out of danger, thereby preventing great loss of life, and when the car has reached the end of its route the fender may be removed and transferred to the other end of the car or folded up out of the way if it be desired to couple another car to that end of the car on which the fender is supported.

It has for a further object to provide a fender of the character set forth embodying advantages in point of perfect operation, strength, simplicity, inexpensiveness, and general utility.

In the drawings, Figure 1 is a perspective view of one end of a car having my fender supported thereon with the parts in operative position. Fig. 2 is a side view thereof, showing the parts in dotted lines in the position they will occupy when the pivoted frame has been operated by the fender striking an object in front of the car and picking it up. Fig. 3 is a side view showing the parts folded up out of the way, so that another car may be coupled to that end of the car on which the fender is supported.

Corresponding parts in all the figures are denoted by the same reference characters.

Referring to the drawings, 1 designates the car, on the frame 2 of the platform of which my fender is supported. The frame 3 of the fender comprises curved side bars 4, each hinged together at 5 and their ends connected together by transversely-extending bars 6 and 7, the top bar 7 hooking over the usual supports 8 on the front part of the frame 2 of the car and supporting the fender. For the purpose of holding the frame 3 in its proper position and cushioning it and for supporting the pivoted frame, to be described, hinged arms 9 are provided, the front ends 10 of which are turned around the bars 4 at a point about midway their length and secured thereto by pins 11, the rear ends 12 engaging and sliding in the usual hangers 13 on the under part of the frame 2 of the platform. The frame 14 of the fender comprises side frames 15, having bars 16 and 17 disposed at right angles to each other and their ends connected together by curved bars 18 and front and rear transversely-extending bars 19, connecting the said frames together at the juncture of the bars 18 with the bars 16 and 17. The frame 14 is pivotally supported with relation to the frame 3 on the ends of a transversely-extending shaft 20, which project through holes in the outer ends of the arms 9 and into hubs 21 on said frames at the juncture of the bars 16 and 17 and are secured therein. For the purpose of holding the pivoted frame in its operative position and then releasing it as soon as the frame 3 is struck by an object in front of the car mechanism is provided on each side of the fender comprising one-tooth ratchets 22, secured on the shaft 20 in close proximity to the arms, pawls 23, pivoted on the arms and adapted to be engaged or disengaged with the teeth on the ratchets, arms 24, one end of each pivoted to the top of its pawl and the other end engaging a hanger, and springs 27, surrounding said arms, their inner ends engaging the hangers and their outer ends engaging holes 28, of which there are a series in each of the arms 9, said holes being selected according to the degree of elevation in which it is desired to hold the frame 3. Springs 26 surround the shaft 20, and one end of each is connected to said shaft and the other end to an arm 9, whereby when the pawls disengage the ratchets said springs will turn the frame 14 on its pivots and throw it up. The frames 3 and 14 may have coarse wire 25 stretched across them, as shown, or a fine-wire mesh, as the desire may be.

The operation is as follows: The parts of the fender being in the position shown in Figs. 1 and 2, if the frame 3 comes into contact with an object in front of the car said frame is pushed back, the ends of the arms 9 are slid through the hangers, compressing the springs thereon, and the inner ends of the arms 25 come into contact with the hangers and disengage the pawls from their ratchets, when the pivoted frame 14 will be thrown up by the springs 26, picking the object up. After the object has been removed from the frame 14 it is pushed back until the bars 17 come opposite the bar 4, when the pawls will again engage the ratchets and the fender is restored to operative position. If it be desired to couple the end of a car having a fender supported thereon to another car, the lower part of the hinged frame 3 is turned up and the pivoted frame turned up and both frames secured by any suitable means.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. A car-fender, comprising a frame supported on the end of a car and a second frame inclosing the lower end thereof and adapted to be reciprocated across said end, substantially as described.

2. A car-fender, comprising a frame supported on the end of a car and a second frame pivoted with relation thereto and inclosing the lower end and adapted to be reciprocated across said end, substantially as described.

3. A car-fender, comprising a frame removably supported on the end of a car and a second frame pivoted with relation thereto and inclosing the lower end and adapted to be reciprocated across said end, substantially as described.

4. A car-fender, comprising a foldable frame supported on the end of a car and a second frame pivoted with relation thereto and inclosing the lower end and adapted to be reciprocated across said end, substantially as described.

5. A car-fender, comprising a frame supported on the front of a car, a second frame pivoted with relation thereto and inclosing the lower end and adapted to be reciprocated across said end, means for locking said second frame in its lower position, and means for automatically throwing said frame up when released, substantially as described.

6. A car-fender, comprising a frame supported on the front of a car, a second frame pivoted with relation thereto and inclosing the lower end and adapted to be reciprocated across said end, means for locking said second frame in its lower position, means for releasing said second frame, and means for automatically throwing said second frame up when released, substantially as described.

7. A car-fender, comprising a foldable frame supported on the front of a car, a second frame pivoted with relation thereto and inclosing the lower end and adapted to be reciprocated across said end, means for locking said second frame, means for releasing said second frame, and means for automatically throwing said second frame up when released, substantially as described.

8. A car-fender, comprising a frame supported on the front of a car, hangers on said car, arms connected to said frame and working in said hangers, springs on said arms, a second frame pivoted with relation to the first frame and inclosing its lower end and adapted to be reciprocated across said end, substantially as described.

9. A car-fender, comprising a frame supported on the front of the car, hangers on said car, arms connected to said frame and working in said hangers, springs on said arms, a shaft mounted in said arms, springs on said shaft one end of each connected thereto and the other end to an arm, a second frame pivoted on said shaft and inclosing the lower end of said first frame and adapted to be reciprocated across said end, ratchet-wheels on said shaft, pawls on said arms engaging said ratchets for locking said second frame in its lower position, and means for automatically throwing said second frame up when released, substantially as described.

10. A car-fender, comprising a folding frame supported on the front of the car, hangers on said car, arms connected to said frame and working in said hangers, springs on said arms, a shaft mounted in said arms, springs on said shaft one end of each connected thereto and the other end to an arm, a second frame pivoted on said shaft and inclosing the lower end of said first frame and adapted to be reciprocated across said end, ratchet-wheels on said shaft, pawls on said arms engaging said ratchets for locking said second frame in its lower position, and means for automatically throwing said second frame up when released, substantially as described.

In testimony whereof I have signed my name in the presence of the subscribing witnesses.

WILLIAM E. ZACHRY.

Witnesses:
PAUL R. TOWNE,
J. C. PYBAS.